US008650575B2

(12) United States Patent
Menyhart

(10) Patent No.: US 8,650,575 B2
(45) Date of Patent: Feb. 11, 2014

(54) PROCESS MANAGER ESTABLISHING SUPER-PROCESS ASSOCIATED WITH DESIGNATED MEMORY TO HOUSE DATA FROM INCIDENT PROCESSES

(75) Inventor: Zoltan Menyhart, Meyland (FR)

(73) Assignee: Bull SAS, Les Clayes Sous Bois (FR)

( * ) Notice: Subject to any disclaimer, the term of this patent is extended or adjusted under 35 U.S.C. 154(b) by 1332 days.

(21) Appl. No.: 12/191,223

(22) Filed: Aug. 13, 2008

(65) Prior Publication Data

US 2009/0064150 A1    Mar. 5, 2009

(30) Foreign Application Priority Data

Aug. 31, 2007 (FR) ...................... 07 06119

(51) Int. Cl.
*G06F 9/46* (2006.01)
*G06F 13/00* (2006.01)

(52) U.S. Cl.
USPC .......................................... 718/104; 711/173

(58) Field of Classification Search
USPC .......................................... 718/104; 711/173
See application file for complete search history.

(56) References Cited

U.S. PATENT DOCUMENTS

| | | | | |
|---|---|---|---|---|
| 4,769,771 | A * | 9/1988 | Lippmann et al. | 709/213 |
| 5,365,606 | A | 11/1994 | Brocker et al. | |
| 6,366,926 | B1 * | 4/2002 | Pohlmann et al. | 1/1 |
| 7,353,361 | B2 * | 4/2008 | Hepkin et al. | 711/203 |
| 7,721,291 | B2 * | 5/2010 | McKenney | 718/104 |
| 2003/0061540 | A1 * | 3/2003 | Lee et al. | 714/31 |

FOREIGN PATENT DOCUMENTS

| | | |
|---|---|---|
| EP | 1 280 051 A | 1/2003 |
| GB | 2 153 118 A | 8/1985 |

OTHER PUBLICATIONS

Daniel P. Bovet; Marco Cesati, "Understanding the Linux Kernel" 3$^{rd}$ Edition, Nov. 2005, XP002471084, Chapter 19.3.5 and Chapter 20.1.
R. D. Weldon et al., "Quantitative Evaluation of the Register Stack Engine and Optimizations for Future Itanium Processors", XP-002471081, pp. 57-67.
G. Banga et al., "Resource Containers: a new facility for resource management in server systems", pp. 45-58, XP-002471082.
H. Midorikawa, "Meta Process Model: a new distributed shared memory programming model", pp. 295-300, XP-002471083.
European Search Report dated Mar. 4, 2008, received in priority French Appln. No. FR 07/06119.
Y. Artsy et al., "Designing a Process Migration Facility: The Charlotte Experience," IEEE Computer, Sep. 1989, pp. 47-56, XP-002471080.

\* cited by examiner

*Primary Examiner* — Meng An
*Assistant Examiner* — Brian Chew
(74) *Attorney, Agent, or Firm* — Miles & Stockbridge P.C.

(57) ABSTRACT

A process manager (36) comprises a process data memory (44), and a process processing unit (38), capable of causing a process code to be executed in interaction with a designated part of this memory. The processing unit (38) is capable of establishing a super-process associated with a designated part of the memory (42) suitable to house the data from one or more processes (34), and is capable of causing the code of each of these processes (34) to be executed in separate interaction with their data. This manager (36) comprises a pooling function (40) organized to load incident processes (34) into a super-process in response to a condition affecting at least in part these incident processes. The processing unit (38) is organized to house incident processes in a super-process in response to a condition affecting the incident processes.

7 Claims, 4 Drawing Sheets

PROCESS MANAGER ESTABLISHING SUPER-PROCESS ASSOCIATED WITH DESIGNATED MEMORY TO HOUSE DATA FROM INCIDENT PROCESSES

The present invention relates to a process manager within the context of the execution of processes related to a computer program within an operating system.

A computer process is a program executed by a computer, with a specific address space that is attached to it.

In modern operating systems, the address space that is associated with a given process is protected to prevent another process (for example another application) from altering its critical data. This is hardware protection, namely that the processors contain specialized hardware registers for each process.

This hardware protection nevertheless poses performance problems, in the sense that some processes must share data or services, but cannot do so as a result of this partitioning. It is then necessary to make several copies of the data to share, which is costly in terms of power and time.

Solutions of the multi-threading type have been developed to enable the process execution performances to be accelerated, by taking advantage of the fact that several processors were available. However, these solutions require a particular writing of the applications, and are therefore not compatible with the existing applications.

The invention improves the situation.

For this purpose, the invention proposes a process manager comprising a process data memory, and a process processing unit, capable of causing a process code to be executed in interaction with a designated part of the process data memory.

The process processing unit is capable of establishing a super-process associated with a designated part of the memory suitable to house the data from one or more processes, and is capable of causing the code of each of these processes to be executed in separate interaction with their data.

This manager also comprises a pooling function organized to house incident processes in a super-process in response to a condition affecting at least in part these incident elementary processes.

Moreover, the process processing unit is organized to house incident processes in a super-process in response to a condition affecting at least in part the code of these incident processes.

Such a process manager is particularly interesting as it enables chosen processes to be united as sub-processes within the same shared process, and therefore be able to work on a common memory space.

In particular embodiments, the manager presents the following characteristics:

the designated part of the memory of a given super-process contains all the process data of all the processes that are associated with it, the housing condition of the incident processes affects a list received by the process manager that associates an identifier of an incident process with an identifier of a super-process, the identifier of an incident process is associated with an identifier of a super-process according to at least one part of the code of the process, the process manager is implemented in the form of a daemon, the process manager is implemented within a Linux operating system, the process data comprises a stack, a heap, a BSS block and a data block, the process data further comprises a register engine block associated with the stack to form a frame, the process data further comprises memory blocks for the evolution of the process, and the processing unit is organized to implement a multi-thread execution.

Other characteristics and advantages of the invention will emerge more clearly through the reading of the following description, given as an illustrative and non-restrictive example on the basis of examples taken from drawings in which.

As mentioned above, to be executed, a conventional process is stored in a memory (generally the RAM memory), for which the access rights are recorded in a hardware register of the processor.

This register is physically protected, namely that the processor implements access rules that ensure that the process associated with a given memory space is the only process able to modify this space.

Figure 1:
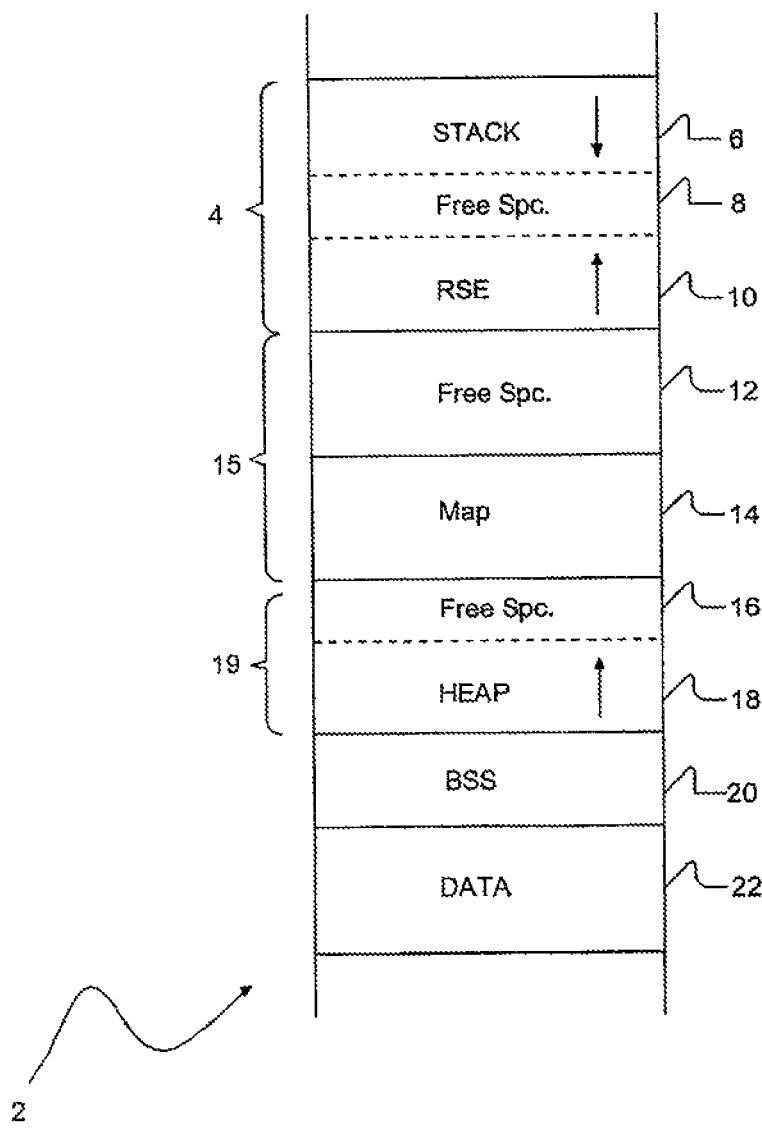
FIG. 1 represents a memory space associated with a conventional process.

In modern computer systems, this space is called the address space and is organized as represented in FIG. 1.

As it can be seen in FIG. 1, an address space 2 comprises a succession of memory bits that are associated with separate functional blocks.

The address space 2 comprises a frame block 4 that comprises a stack 6, a free memory block 8, and a register stack engine block 10 (RSE). In frame 4, the arrows indicate the stacking direction of the data in the respective blocks.

The stack 6 is used to stack the data of the functions as and when one function calls another, etc. Like any stack, it operates according to a FILO principle, namely that the first instruction introduced is the last to be recovered. This stack therefore enables the local variables to be stored and the instructions of the process to be executed sequentially.

The block 8 is used to provide an extension space for the stack 6 and the engine block 10, to enable it to expand in the event that its size exceeds the size that is allocated to it on creation of the address space associated with the process.

The engine block 10 is an optional element that is present in certain hardware architectures only. Its role is to store the content of the processor registers when one function calls another, etc. The block 12 fills the same role as the block 8, but this time with respect to the engine block 10.

Consequently, the engine block 10 makes it possible that, when a first function calls a second function, the first function can rapidly access the data of this second function. This particular implementation is for example implemented in Itanium processors (registered trademark).

In the absence of the engine block 10 and the corresponding processor architecture, the first function must access the stack associated with the second function, then stack this data in its own stack for manipulation.

Other uses can be made of the engine block 10, in particular to receive the dependent dynamic data from the processor. The said engine block can also be totally absent. The data that this block stores is the same as the data for the function calls.

The address space 2 then comprises a free memory block 12 and a mapping block 14 forming a mapping group 15. The block 12 fulfills the same role as the block 8, but here with respect to the mapping block 14.

The mapping block 14 is used to receive in the working memory of the processor of the data from the read-only memory of the computer. This data block is regularly synchronized with the corresponding file in the read-only memory, so that any change made to the working memory block is also reflected in the corresponding file.

Following the mapping group 15, the address space 2 comprises a block 16 of free memory and a heap 18 forming a heap group 19. The block 16 fulfills the same role as the block 8, but this time with respect to the heap block 18.

The heap 18 is used to receive the data that the process decides to create, such as global variables for example. In contrast to the stack 6, this memory block remains allocated even after the end of the process, as long as it receives no clearing instruction.

This means that the said memory block cannot be accessed to write other data as long as it has not been cleared, namely as long as the memory has not received an instruction specifying that this block is no longer used.

The addressing space 2 comprises a BSS block 20 after the heap group 19. The BSS block 20 is used to receive data that is initialized to 0 when the execution of the process is started.

Finally, after the BSS block 20, the addressing space comprises a data block 22. The data block 22 receives the process execution contextual data, from the executable file.

It will be noted that the aforementioned text represents a particular embodiment of an address space. Hence, some blocks, such as the engine block 10 can be omitted, and others can have a different role.

For example, the blocks 8, 12, and 16 have been presented here as attached respectively to the blocks 6 and 10, 14 and 18. However, in other implementations, these blocks are not necessarily attached to other blocks. These blocks are then used as free memory that can be filled in accordance with the evolution of the process, irrespective of the original block.

As has been mentioned above, it is not possible to share the data of one process with another process. In fact, the transfer of data from one process to another requires two copy operations of the data to share.

A first copy operation is necessary to feed back this data into a global resource of the operating system. Next, a second copy is necessary. This time, the second process will search for the data in the system global resource that has just been created, so that the latter can manipulate the shared data.

This is extremely costly in terms of performance, as the memory access times are prohibitive when compared with the processor speed.

Figure 2:
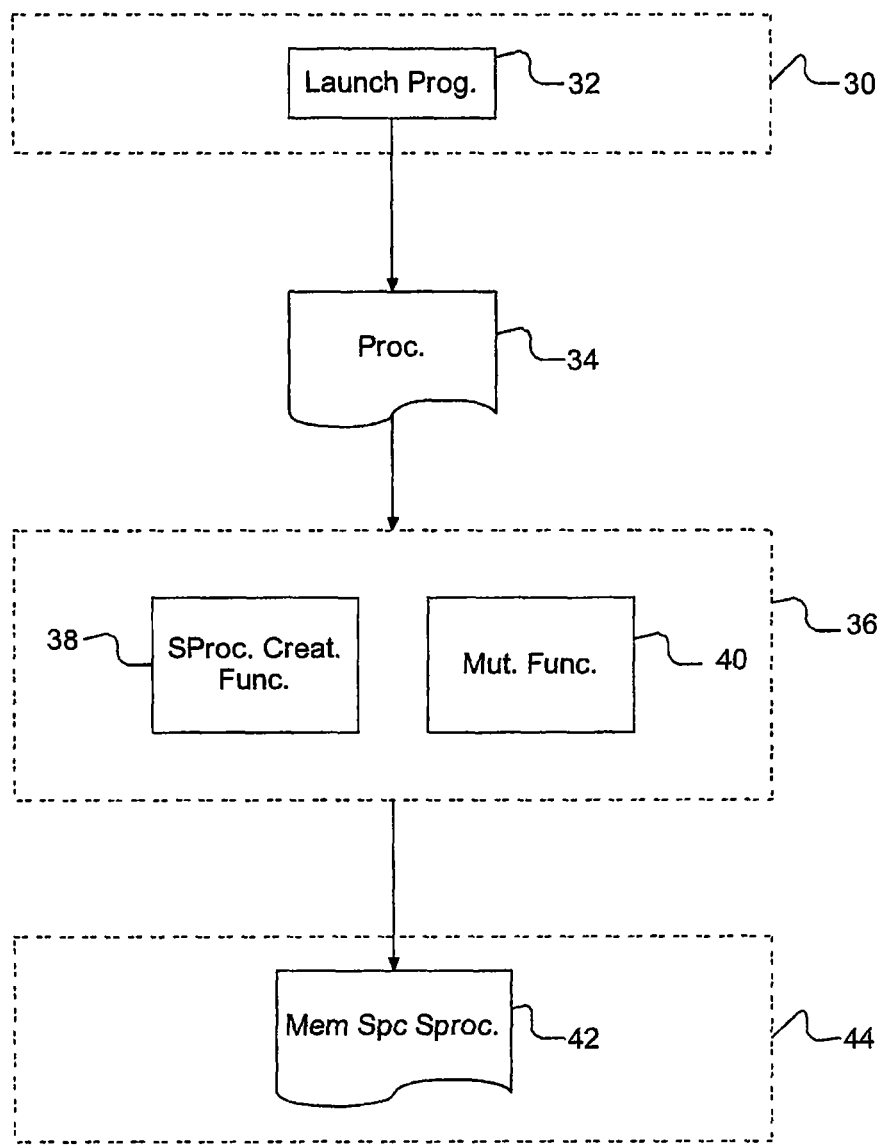
FIG. 2 represents a process manager according to the invention in its environment.

The process manager represented in FIG. 2 can circumvent the physical protection mechanisms between processes and thus offer the possibility of preventing the unnecessary memory access costs.

As it can be seen in FIG. 2, an operating system 30 comprises an application 32 to cause the processes to be executed.

The operating system 30 can be of any type, such as for example of the Windows (registered trademark) family, the Unix (registered trademark) family or the Linux (registered trademark) family or any other similar type of operating system. In the case of the Windows (registered trademark) family, the application 32 is called "explorer", and in the case of the Unix (registered trademark) and Linux (registered trademark) families, the application 32 is called "shell".

In the preferred embodiment of the invention, it is the Linux operating system and its "shell" application that are used.

To cause a process 34 to be executed within the context of a conventional operating system, the application 32 would call operating system loading functions to load the process 34 into memory for its execution.

Loading is understood to mean all of the operations necessary to define the address space associated with a given process, the corresponding definition of access rights in the processor, and the scheduling of the execution of this process among the processes to be executed.

Within the context of the invention, the application 32 calls separate loading functions. From a functional point of view, these functions noticeably fulfill the same role as the conventional loading functions, but by defining the processes in a different manner, and by calling on a process manager 36 whose role will now be explained.

The process manager 36 is a software component added within the context of the invention and that does not exist in conventional operating systems. The processes 34 that are processed by the process manager 36 will subsequently be qualified as incident processes.

Hence, in contrast with the conventional case in which a private address space is allocated to the process 34, the manager 36 processes the incident processes in a selective and controlled manner, by associating them with one or more other incident processes currently being executed or pending, and by loading them all together into an address space that will be described with FIG. 3.

The processes loaded into a same address space can thus share previously private data, while conserving a part of specific data, as it will emerge below.

In the embodiment described here, the process manager 36 is a daemon that receives execution requests from the loading functions called by the application 32, and that carries out itself the loading of incident processes into the pooled address spaces.

The process manager 36 comprises a processing unit 38 and a pooling function 40.

The function of the processing unit 38 is to create super-processes on request by the loading functions. A super-process is a process for which the address space is organized to contain the incident process data that is associated with it.

Within the context of their association with a super-process, the incident processes 34 are qualified as elementary processes, as, although their data is identical to the incident processes from which they are derived, they do not possess any associated private address space as in the case of conventional operating systems.

The role of the processing unit 38 is also to cause the code of the elementary processes associated with the super-processes to be executed. This unit can also implement a multi-thread execution of the elementary processes.

The role of the pooling function 40 is to associate an incident process 34 with a super-process. To achieve this, the pooling function must load an incident process 34 into the address space 42 of the super-process associated with the random access memory (RAM) 44.

The pooling function 40 does not decide on the association between an incident process and a super-process: it is the loading functions that specify with which super-process a given incident process must be associated.

The super-processes are processes similar to the processes 34, apart from that which concerns their address space 42, which will now be described by means of FIG. 3.

Figure 3:
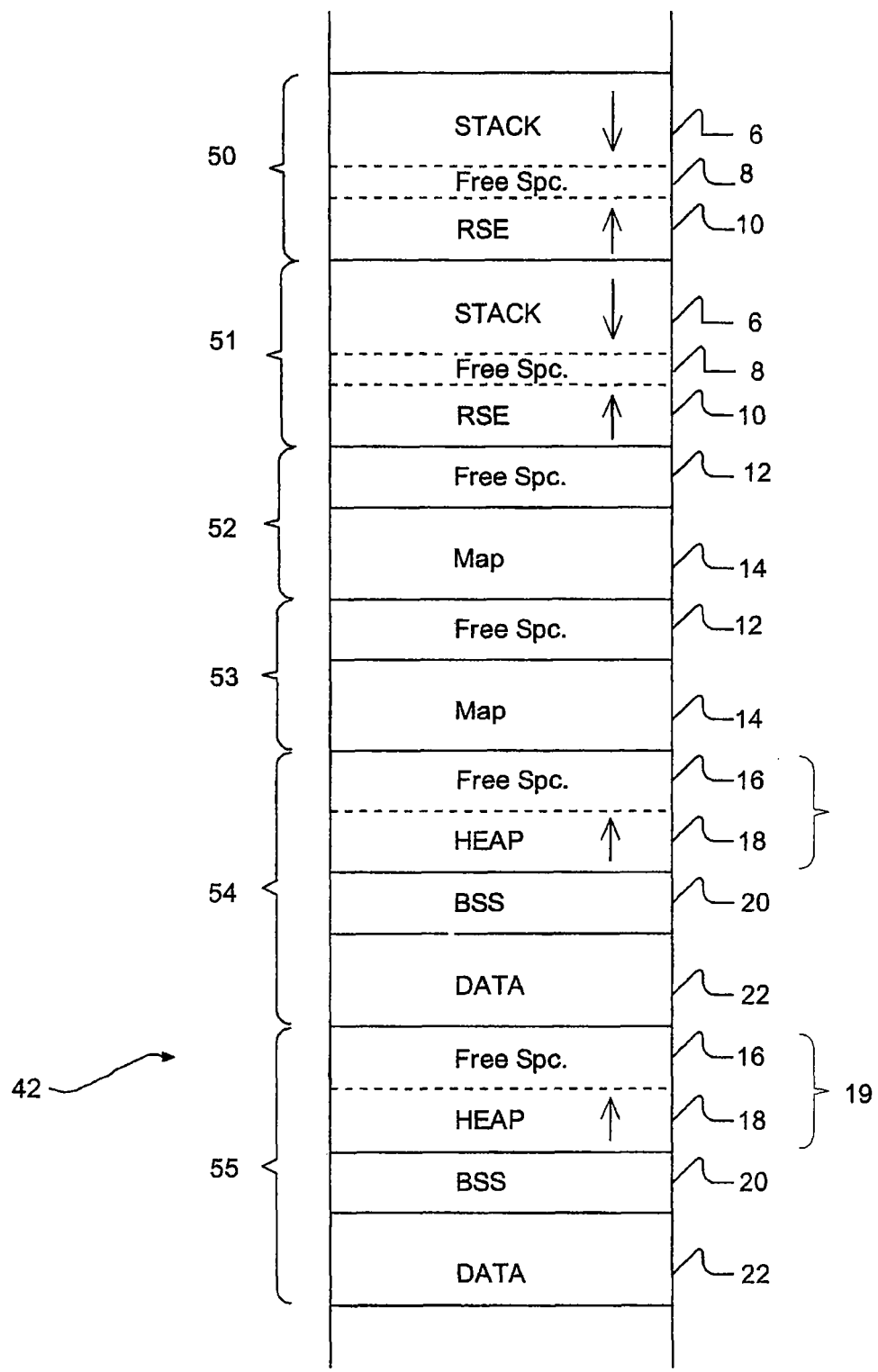
FIG. 3 represents a memory address space associated with a super-process by the process manager of FIG. 2.

As it can be seen, FIG. 3 represents the address space 42 of a super-process, with which two elementary processes are associated.

The address space 42 comprises a frame for each of the elementary processes, respectively referenced 50 and 51. The frames 50 and 51 are similar to the frame 6 of FIG. 1, and each one comprises a stack, a memory block 8 and a register stack engine 10.

The frames 50 and 51 are followed by mapping groups 52 and 53 similar to the mapping group 15 of FIG. 1 and each one associated with one of the two elementary processes. The mapping groups 52 and 53 each comprise a memory block 12 and mapping block 14.

After the mapping groups 52 and 53, the addressing space 42 comprises two structures 54 and 55 each associated with one of the elementary processes, each structure comprising:
- a heap group similar to the heap group 19 of FIG. 1, which comprises a memory block 16 and a heap 18,
- a BSS block similar to the BSS block 20 of FIG. 1, and
- a data block similar to the data block 22 of FIG. 1.

Hence, the addressing space 42 effectively comprises all the data of the two elementary processes. Within this address space, each elementary process has an addressing space that is specific to it for storing the global data, which are referenced 54 and 55 in FIG. 3.

This enables them to be executed via their respective stack, while making possible data sharing between them without associated memory access.

Furthermore, the data of the elementary processes is fully present in a separate manner. This ensures that the processes have a specific memory space as soon as they are loaded, without any application having to rearrange their data.

The processes can thus be executed in separate interaction with their data, while having access to the data of the other processes present in the address space that avoids the double copy problem mentioned above.

Figure 4:
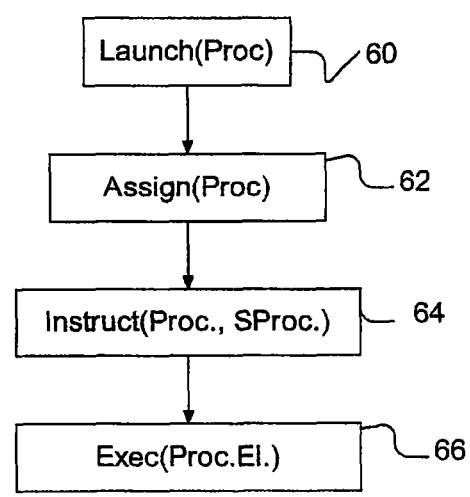
FIG. 4 represents a flow chart of an execution of a process.

FIG. 4 shows a flowchart illustrating the processing of a given process, from the operating system up to the processor.

Initially, the application 32 starts a Launch( ) function with a Proc process as argument in a step 60.

The Launch( ) function is one of the loading functions implemented within the context of the invention, and has the role of recovering the data of the Proc process from Proc.Dat data.

This data is of two functional kinds: execution data, namely the code itself to execute, and contextual data, characteristic of the process execution context, such as the variables of a function.

When the Proc process data is recovered, an Assign( ) function is called with the Proc.Dat data as an argument in a step 62.

This function has the role of assigning the Proc incident process to an existing super-process, or of creating a super-process to receive it. The result of this function is a pair (Proc.Dat., SProc) that associates the incident process with its super-process.

Once the Assign( ) function is terminated, an Instruct( ) function is called with the pair (Proc.Dat., SProc.) as argument in a step 64.

The Instruct( ) function has the role of transmitting the incident/super-process process pair to the process manager 36.

Within the context of the invention, the Instruct( ) function records the pair (Proc.Dat., SProc.) in a shared part of the operating system memory that is called Shared Memory (SHM), that the process manager 36 consults regularly to discover and process the new elementary processes to execute.

Other implementations may be possible for transmitting the incident processes to the process manager 36, for example by message communications of the send/receive type available in the operating systems.

Next, the elementary process is executed in a step 66, as has been described previously, by calling the processing unit 38 to create a super-process if this is necessary, then by calling the pooling function 40 to load the elementary process into the super-process address space.

Although the functions 60, 62 and 64 have been described as separate functions, it may be possible to practice them differently, by gathering two of them together, or by regrouping them into a single function.

Although the present invention has been described with reference to particular embodiments, one of ordinary skill in the art will be able to envisage all of the equivalent particular embodiments that fall within the scope of the following claims.

The invention also covers, as products, the software elements described, made available on any medium that can be read by a computer. The expression "medium that can be read by a computer" comprises the magnetic, optical and/or electronic data storage media, as well as a transmission medium or vehicle, such as an analog or digital signal.

The invention claimed is:

1. A computer process manager, comprising a process data memory, and a process processing unit, and configured to cause a process code to be executed in interaction with a designated part of the process data memory,
    wherein the process processing unit is configured to establish a super-process associated with a designated part of the process data memory suitable to house the data from one or more processes, and to cause the code of each of these processes to be executed in separate interaction with their data,
    and including a pooling function organized to load incident processes into a super-process in response to a condition affecting at least in part the incident processes,
    wherein the designated part of the process data memory of a given super-process contains all the process data of all the processes that are associated with it such that the designated part of the process data memory is not partitioned by registers that are exclusive to corresponding processes,
    wherein a housing condition of the incident processes affects a list received by the process manager that associates an identifier of an incident process with an identifier of a super-process according to at least one part of the code of the process.

2. The process manager according to claim 1, wherein the process manager is implemented in the form of a daemon.

3. The process manager according to claim 1, wherein the process manager is implemented in a Linux operating system.

4. The process manager according to claim 1, wherein the process data comprises a stack, a heap, a block started by symbol (BSS) block and a data block.

5. The process manager according to claim 4, wherein the process data further comprises a register engine block associated with the stack to form a frame.

6. The process manager according to claim 4, wherein the process data further comprises memory blocks for the evolution of the process.

7. The process manager according to claim 1, wherein the processing unit is organized to implement a multi-thread execution of the incident processes housed in a super-process.

* * * * *